(12) United States Patent
Suzumori

(10) Patent No.: US 9,688,226 B2
(45) Date of Patent: Jun. 27, 2017

(54) BUMPER REINFORCEMENT

(71) Applicant: TOYODA IRON WORKS CO., LTD, Toyota-shi, Aichi (JP)

(72) Inventor: Michio Suzumori, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 15/228,310

(22) Filed: Aug. 4, 2016

(65) Prior Publication Data
US 2017/0036623 A1  Feb. 9, 2017

(30) Foreign Application Priority Data

Aug. 7, 2015 (JP) .................................. 2015-156852

(51) Int. Cl.
*B60R 19/18* (2006.01)
*B60R 19/02* (2006.01)

(52) U.S. Cl.
CPC ............ *B60R 19/023* (2013.01); *B60R 19/18* (2013.01); *B60R 2019/1806* (2013.01)

(58) Field of Classification Search
CPC ................ B60R 19/18; B60R 2019/18; B60R 2019/1806

USPC .................................. 293/102, 120, 121, 122
See application file for complete search history.

(56) References Cited

U.S. PATENT DOCUMENTS

| 3,815,946 | A | * | 6/1974 | Jullig | ...................... | B60R 19/26 |
| | | | | | | 293/134 |
| 6,764,119 | B2 | * | 7/2004 | Bladow | ................... | B60R 19/18 |
| | | | | | | 293/102 |
| 9,283,908 | B2 | * | 3/2016 | Blumel | .................. | B21D 53/88 |

FOREIGN PATENT DOCUMENTS

| GB | 1497438 | * | 1/1978 |
| JP | 2010-042753 A | | 2/2010 |

* cited by examiner

*Primary Examiner* — Dennis H Pedder
(74) *Attorney, Agent, or Firm* — Oliff PLC

(57) ABSTRACT

A bumper reinforcement comprising an elongated, channel-shaped body member with a bottom portion, sidewall portions, and an open side and a closure member closing the open side of the body member so that the bumper reinforcement has a closed cross section. The closure member provides an impact surface that receives an external impact. The closure member comprises lateral edges and a central portion, the closure member being welded to the body member with the lateral edges of the closure member laid on inner surfaces of open side edges of the sidewall portions of the body member.

8 Claims, 7 Drawing Sheets

BUMPER REINFORCEMENT

INCORPORATION BY REFERENCE

The disclosure of Japanese Patent Application No. 2015-156852 filed on Aug. 7, 2015 including the specification, drawings and abstract is incorporated herein by reference in its entirety.

BACKGROUND OF THE INVENTION

1. Field of the Invention

The present invention relates to a bumper reinforcement. In particular, the present invention relates to a bumper reinforcement in the front or rear of the body of an automobile to resist to collision impact during a vehicle collision.

2. Description of Related Art

An automobile may typically be provided with a bumper structure in the front or rear of the automobile body to receive an impact caused by a vehicle collision. The bumper structure generally includes a core member called a bumper reinforcement. The bumper reinforcement is disposed in the automobile body to extend along the width of the automobile body, and supported at its end sections by support members that are attached to the body frame of the automobile.

FIG. 12 schematically illustrates a conventional bumper reinforcement 114. The bumper reinforcement 114 is generally composed of a body member 120 and a closure member 122. The body member 120 has an inverted hat-shaped cross section as seen in FIG. 12, with an open side upward, and flanges 126 extending outward from the open side edges. The opening of the body member 120 is closed by the closure member 122 so that the bumper reinforcement 114 has a closed cross section. The closure member 122 is spot welded at 128 to the flanges 126 of the body member 120.

In the bumper reinforcement 114 shown in FIG. 12, the upper surface of the closure member 122 provides an impact surface during a vehicle collision as seen in FIG. 12, expecting that a collision impact may input the bumper reinforcement 114 from above during a vehicle collision. The performance of the bumper reinforcement 114 during such a vehicle collision can be evaluated under a three-point bending test as illustrated in FIG. 13. In the three-point bending test, the bumper reinforcement 114 is supported by support members 118 positioned where bumper support structures would be situated, and then an impact load is applied to the center of the upper surface with a loading means 136, also called an impactor.

When subjected to an impact load by the impactor 136, the bumper reinforcement 114 bear the load with its middle section deflected downward as indicated by the dashed line in FIG. 13. The bumper reinforcement 114 has a closed cross section to provide a higher strength so that the bumper reinforcement can bear greater impact load.

As the bumper reinforcement 114 is deflected downward under the impact load as shown in FIG. 13, the welding joints between the flanges 126 of the body member 120 and the closure member 122 will experience forces directed such as to exfoliate the welded joints, as indicated by the arrows in FIG. 12. This is because the welded surfaces extend perpendicular to the direction of the applied load.

As generally known, a joint by spot welding has a lower strength against exfoliation than against shearing. The conventional cross-sectional configuration as described above may lead to exfoliation of the spot welds between the flanges 126 of the body member 120 and the closure member 122, and thus the closed cross section of the bumper reinforcement may not sufficiently demonstrate its effect in strength.

In addition, the conventional bumper reinforcement 114 in which the closure member 122 serves as an impact surface as described above may result in a inward deflection or collapse of the sidewall portions 120b and 120c of the body member 120, and therefore cannot provide a sufficient strength.

SUMMARY OF THE INVENTION

The present invention provides, in an aspect, a bumper reinforcement comprising an elongated, channel-shaped body member with a bottom portion, sidewall portions, and an open side and a closure member closing the open side of the body member so that the bumper reinforcement has a closed cross section. The closure member may provide an impact surface that receives an external impact. The closure member may comprise lateral edges and a central portion, the closure member being welded to the body member with the lateral edges of the closure member laid on inner surfaces of open side edges of the sidewall portions of the body member.

In some embodiments, the bumper reinforcement may be disposed in a front or rear of an automobile such that the bumper reinforcement extends along a width of the automobile and that the open side of the body member is directed outward of the automobile.

In some embodiments, the central portion of the closure member may be substantially planar and extending in a plane of open side edges of the channel-shaped body member at the closure member. The closure member may further comprise a transitional portion between the central portion and each edge portion, the transitional portion being recessed toward the bottom portion of the body member.

In some embodiments, no flanges are present at the open side edges of the body member.

In some embodiments, the bumper reinforcement may further include a stiffener disposed inside the body member and closure member, the stiffener having lateral portions that project toward the sidewall portions of the body member, and the stiffener being joined to the bottom portion of the body member and to the closure member.

In some embodiments, the stiffener may be generally rhombic or squashed hexagonal or octagonal with a substantially planar upper portion joined to the closure member and a substantially planar lower portion joined to the bottom portion of the body member.

In some embodiments, the lateral portions of the stiffener are spaced from the sidewall portions of the body member with a clearance therebetween to allow for an inward deflection of the sidewall portions of the body member when the bumper reinforcement is subjected to an external impact.

In some embodiments, the stiffener may comprise two stiffener halves joined to each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention will be described below with reference to the drawings.

Figure 1:
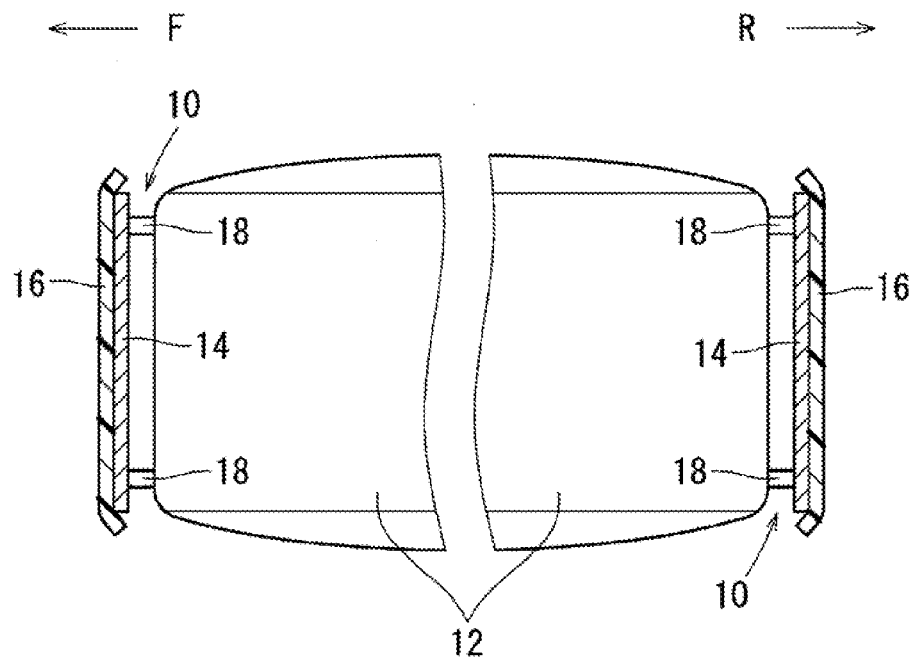
FIG. 1 is a schematic view illustrating an exemplary arrangement of bumper structures in an automobile body according to an embodiment of the invention.

Referring to FIG. 1, the arrangement of bumper structures 10 in an automobile is illustrated in one embodiment. The automobile body 12 is typically provided with bumper structures 10 in the front and rear which extend along the body width. In FIG. 1, F and R represent the front and the rear of the automobile body 12, respectively. The bumper structure 10 may comprise a bumper reinforcement 14, a bumper covering member 16, and bumper support members 18. The bumper reinforcement 14 is a core member of the bumper structure 10 in terms of strength. The bumper covering member 16 covers the front surface of the bumper reinforcement 14. The bumper covering member 16 is disposed outermost of the bumper structure 10 and designed chiefly in consideration of appearance. The bumper covering member 16 may be composed of a plastic or other polymer that is suitable for forming into desired designs.

The bumper support members 18 are disposed between frame members (not shown) of the automobile body 12 and the bumper reinforcement 14 at the end sections of the bumper reinforcement 14 (i.e., in the width of the automobile body 12). An external impact received by the bumper reinforcement 14 is transferred through the bumper support members 18 to the automobile body 12, and thus borne by the automobile body 12. In the descriptions below, the bumper reinforcement 14 will be described as disposed in the front of the automobile body 12. However, the bumper reinforcement 14 may be disposed in the rear of the automobile body.

Figure 2:
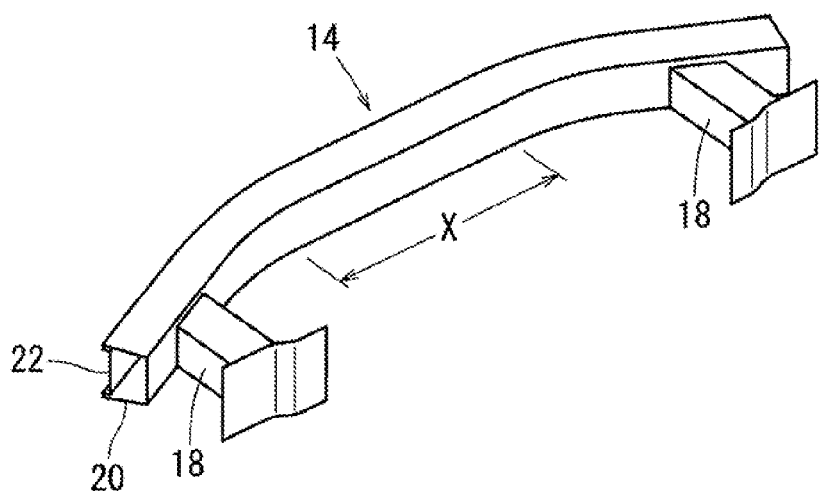
FIG. 2 is a rear left perspective view of a bumper reinforcement according to an embodiment.

With the front bumper structure as described above, an impact force of a frontal collision that acts on the central portion of the bumper structure 10 is first received by the bumper covering member 16, and then transferred to the bumper reinforcement 14. The impact forces experienced by the bumper reinforcement 14 are then transferred through the bumper support members 18 at the end sections of the bumper reinforcement 14 to the automobile body 12. FIG. 2 illustrates the arrangement of the bumper reinforcement 14 and the bumper support members 18 as seen obliquely from the rear left.

Figure 3:
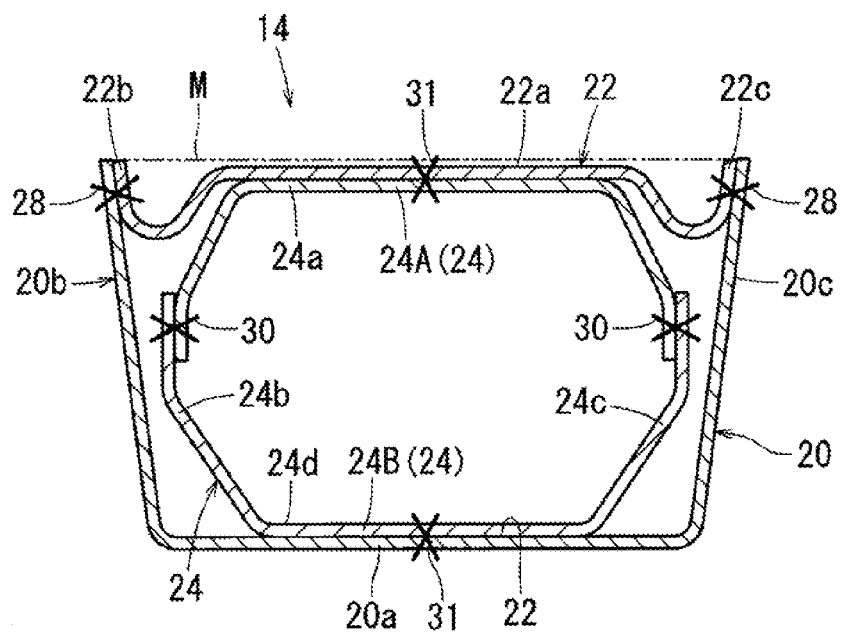
FIG. 3 is a cross-sectional view of the bumper reinforcement of FIG. 2 at the central section of the bumper reinforcement.
Figure 4:
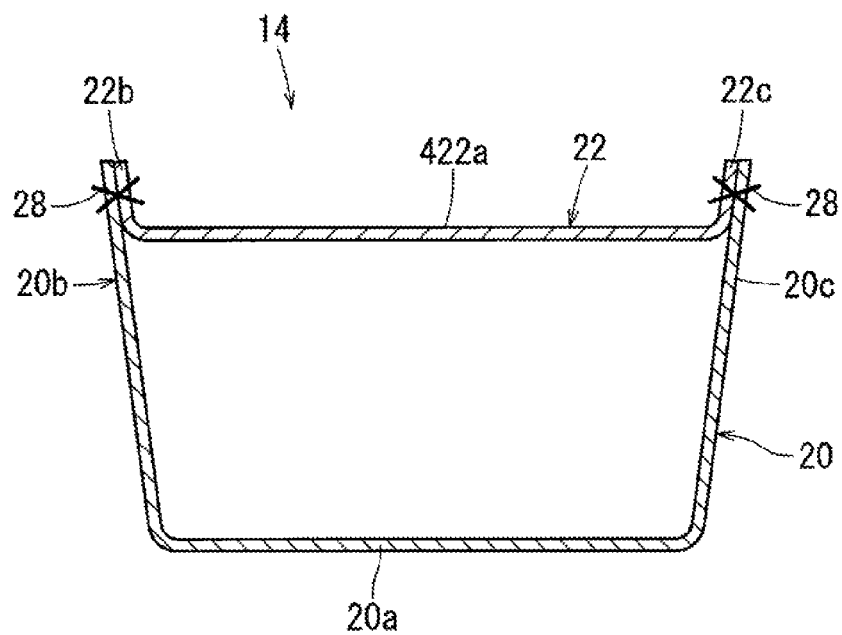
FIG. 4 is a cross-sectional view of the bumper reinforcement of FIG. 2 at the end sections of the bumper reinforcement.

FIG. 3 shows the cross section of the bumper reinforcement 14 of FIG. 2 at a location within a range X in the middle section. FIG. 4 shows the cross section of the bumper reinforcement 14 of FIG. 2 at the end sections, out of the range X. Referring to FIG. 3, the bumper reinforcement 14 in the middle section comprises a body member 20, a closure member 22, and a stiffener 24. The members 20, 22, and 24 may typically be made of steel. The body member 20 is a channel-shaped, elongated member or beam with an open side which is directed toward the outside of the automobile, i.e. the far side from the passenger compartment in the automobile 12. In FIG. 2, the outside of the automobile is shown generally upward. In some embodiments, the channel-shaped body member 20 may include flanges extending outwardly from the open side edges, while in other embodiments the body member 20 may include no such flanges. In the shown embodiment, the channel-shaped body member 20 has no flanges.

Figure 7:
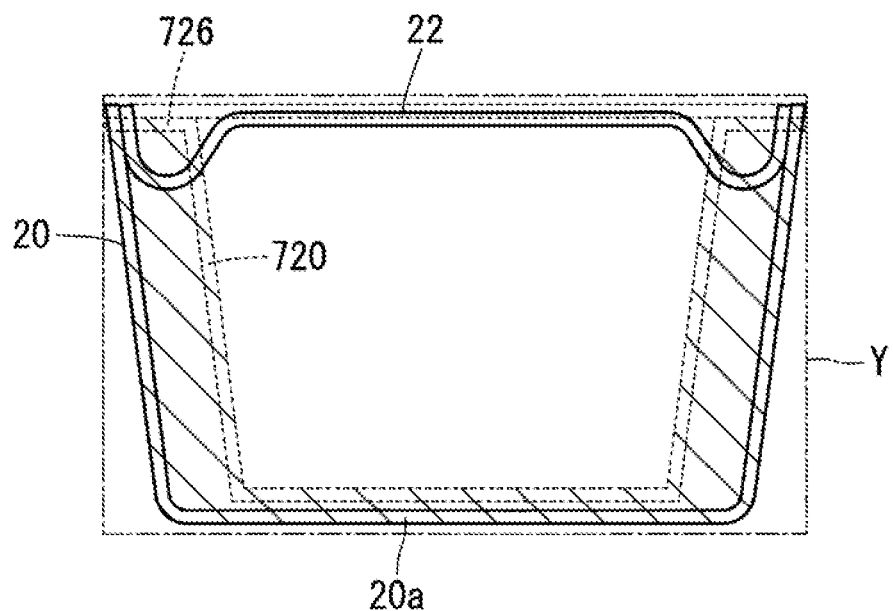
FIG. 7 is a cross-sectional view of a bumper reinforcement, illustrating the difference in the area of its closed cross section with and without flanges according to some embodiments.

In embodiments where no flanges are included at the open side edges of the body member 20 as shown, the size of the bumper reinforcement 14 can be maximized to substantially fit in the space for installation if only a limited space is available. This allows for a larger area of the cross section of the body member 20 and closure member 22, leading, to an improved impact resistance. FIG. 7 shows the cross section of the bumper reinforcement 14 for such a case. As shown in FIG. 7, if the area Y defined by the phantom line in FIG. 7 represents the area given for installing the bumper reinforcement 14, the body member 20 provided with flanges 26 can be dimensioned as indicated by the broken line, while the body member 20 with no flanges can be dimensioned as large as indicated by the solid line. The arrangement with no flanges indicated by the solid line can thus have a larger area of the cross section by the hatched area than the arrangement with the flanges 26 indicated by the broken line, thereby providing an improved strength and so an increased impact resistance.

The closure member 22 closes the open side of the channel-shaped body member 20. The closure member 22 may provide an impact surface that receives an external impact caused, for example, by a vehicle collision. The closure member 22 may be an elongated plate or sheet that is shaped and dimensioned to cover generally the entire open side of the body member 20. As shown in FIG. 3, the closure member 22 may be joined to the body member 20 with the lateral edges 22b and 22c of the closure member 22 laid on the inner surface of the respective sidewall portions 20b and 20c at the open side edges of the channel-shaped body member 20. In one embodiment, the lateral edges 22b and 22c of the closure member 22 may each include a curved portion that is depressed toward the bottom portion 20a of the body member 20. In one embodiment, a central portion 22a of the closure member 22 may be planar and extend along the plane (shown on the dashed line M) that joins the open side edges of the channel-shaped body member 20.

As shown in FIG. 3, the lateral edges 22b and 22c of the closure member 22 may be spot welded at 28 to the open side edges of the sidewall portions 20b and 20c of the body member 20. In the drawings, the weld locations are indicated by cross marks. In various embodiments, the welding processes that may be used for the joints described above and below may include spot welding, arc welding, laser welding, or any other suitable welding process. The sidewall portions 20b and 20c of the body member 20 and the lateral edges 22b and 22c of the closure member 22, which are spot welded at 28, may extend in the plane in which impact forces may act on the surface of the closure member 22 so that such forces act on the welding spots. 28 as shearing forces.

As shown in FIG. 3, the planar central portion of the closure member 22 may be flush with the open side edges of the channel-shaped body member 20 so that the open side edges of the body member do not interfere with an impacting object or component that may come in contact with the surface of the closure member 22.

As shown in FIG. 3, the stiffener 24 is disposed in the closed form of the body member 20 and closure member 22. In one embodiment, the stiffener 24 may be composed of two halves, an upper half 24A and a lower half 24B, joined to each other, with the corresponding edges of the halves laid on and joined to each other, for example, by welding 30. The upper and lower stiffener halves 24A and 24B may have the same cross section to achieve commonality of parts and thereby reduce manufacturing cost. The stiffener halves 24A and 24B may be welded with the edges of the halves 24A and 24B in abutment with each other. In some embodiments, the upper and lower stiffener halves 24A and 24B may be formed in different shapes without achieving commonality of parts. In other embodiments, the stiffener 24 may be a unitary part formed in a desired (e.g. generally rhombic) shape as discussed below.

As seen in FIG. 3, the stiffener 24 is generally composed of an upper portion 24a, lateral portions 24b and 24c, and a lower portion 24d, such that the stiffener has a closed, generally rhombic or squashed hexagonal cross section. The upper portion 24a is placed against the lower surface of the central portion 22a of the closure member 22, and joined thereto by laser welding 31. The lower portion 24d is placed against the upper surface of the bottom portion 20a of the body member 20, and joined thereto by laser welding 31. The lateral portions 24b and 24c are each angled to project toward the sidewall portions 20b and 20c of the body member 20. The projecting lateral portions 24b and 24c of the stiffener 24 are spaced from the sidewall portions 20b and 20c of the body member 20 with a clearance between them. This clearance facilitates inward deformation of the sidewall portions 20b and 20c of the body member 20 due to an external impact when the sidewall portions 20b and 20c are deformed in order to minimize outward deformation of the sidewall portions 20b and 20c.

The stiffener 24 may be secured to the body member 20 and closure member 22 after the closure member 22 is spot welded at 28 to the body member 20 into the closed form. For example, the stiffener 24 is placed into the channel-shaped body member 20 with the closure member 22 not joined to the body member 20. The closure member 22 is then spot welded at 28 to the body member 20 to enclose the stiffener 24 in the hollow bumper reinforcement. The upper portion 24a of the stiffener 24 is then joined to the central portion 22a of the closure member 22 by the laser welding 31 from outside of the closure member 22. The lower portion 24d of the stiffener 24 is joined to the bottom portion 20a of the body member 20 by the laser welding 31 from the outside of the body member 20.

Referring to FIG. 4, the cross-sectional configuration of the end sections of the bumper reinforcement 14 shown in FIG. 2 will now be described. In the descriptions below, the features that are different from those shown in FIG. 3 will be mainly described, and similar features to FIG. 3 may be given the similarly numbered reference numerals to omit detailed description thereof. The configuration of the body member 20 may be the same as that in FIG. 3. The configuration of joint between the lateral edges 22b and 22c of the closure member 22 and the sidewall portions 20b and 20c of the body member 20 may also be the same as that in FIG. 3. However, the position of the central portion 422a of the closure member 22 is different from that shown in FIG. 3 in that the central portion 422a generally extends at the level of the lower ends of the lateral edges 22b and 22c of the closure member 22 as shown in FIG. 4, rather than being raised at the level of the plane of the open side edges of the body member 20 (i.e. at the dashed line in FIG. 3). This positioning facilitates shaping the closure member 22, which is made possible because the bumper reinforcement 14 in such end sections may experience a collision impact on fewer occasions. This also makes the area of the cross section smaller than that in FIG. 3. The inner stiffener 24 does not extend to the end sections of the bumper reinforcement 14. In one embodiment, the closure member 22 may have gradually varied cross sections from the middle section, such as within the range X defined in FIG. 2, to the end sections, that is, between those shown in FIGS. 3 and 4. In other embodiments, the closure member 22 may have stepwise varying cross sections along the length. In alternative embodiments, the stiffener 24 may extend to the end sections of the bumper reinforcement 14 so that the bumper reinforcement 14 include the stiffener 24 over the entire length.

Figure 5:
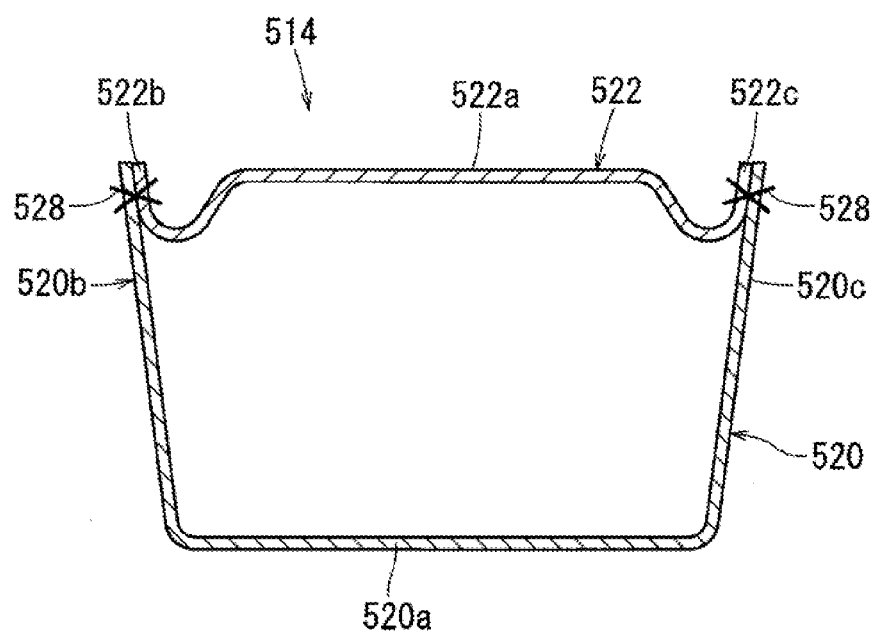
FIG. 5 is a cross-sectional view of a bumper reinforcement with a modified central portion of the closure member according to another embodiment.

Referring to FIG. 5, a modified cross section of the bumper reinforcement 514 is shown in another embodiment. The modification shown in FIG. 5 is preferable particularly in cases where the body member 520 and closure member 522 joined into the closed configuration as described above provide the desired strength without any stiffener inside. This simplifies the configuration and reduces the manufacturing cost due to the omitted stiffener.

Figure 6:
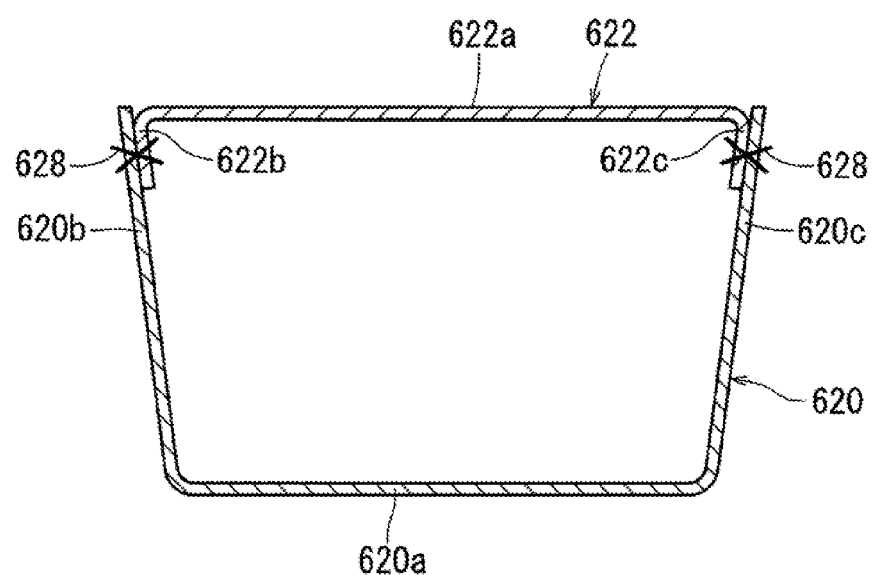
FIG. 6 is a cross-sectional view of a bumper reinforcement with a modified central portion of the closure member according to yet another embodiment.

Referring to FIG. 6, still another modified cross section of the bumper reinforcement 614 is shown in another embodiment. In this modification, the central portion 622a of the closure member 622 is positioned at the level flush with the open side edges of the body member 620. The lateral edges 622b and 622c of the closure member 622 are bent to extend toward the bottom portion 620a of the channel-shaped body member, or downward as seen in FIG. 6, and are laid on the sidewall portions 620b and 620c of the body member 20 and spot welded thereto at 628.

Figure 8:
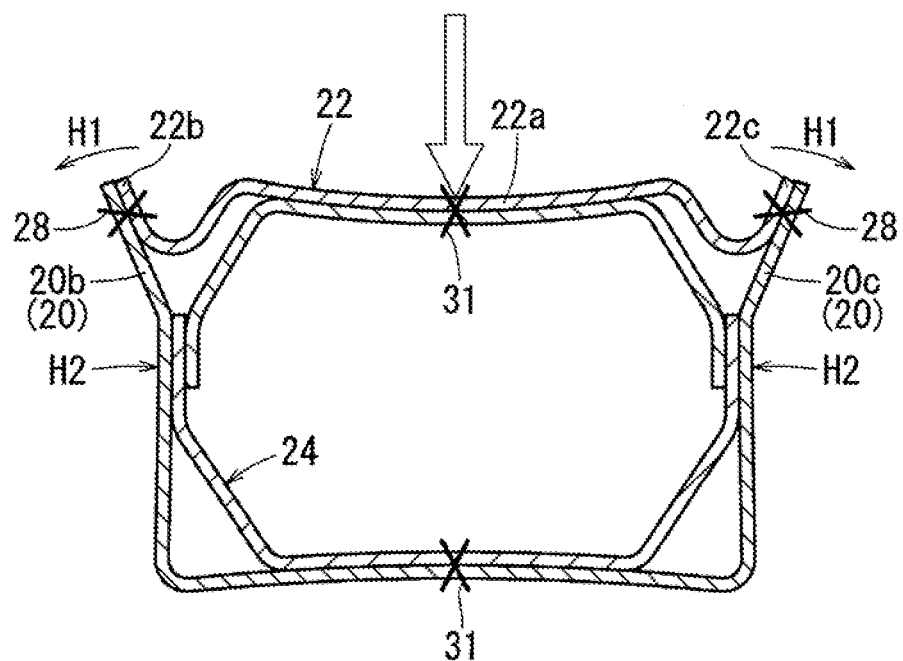
FIG. 8 is a cross-sectional view of a deformed bumper reinforcement of FIG. 3 after being subjected to an impact load.
Figure 13:
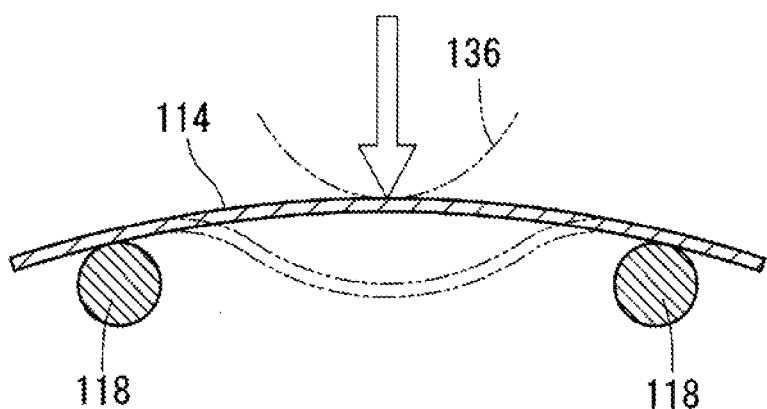
FIG. 13 illustrates a condition of the three-point bending test.

Referring to FIG. 8, the operation of the bumper reinforcement shown in FIGS. 2 to 4 in the event of a frontal collision will now be described. FIG. 8 shows the deformed cross section of the bumper reinforcement during a performance evaluation according to the three-point bending test as illustrated in FIG. 13. When an impact load is applied to the central portion 22a of the closure member 22 as shown in FIG. 8, the applied load acts at the spot welds 28 that join the lateral edges 22b and 22c of the closure member 22 and the sidewall portions 20b and 20c of the body member 20. Since the joint plane extends in generally the same direction as the loading direction, the force experienced at the spot welds 28 will be a shearing force. Since the spot welds 28 have a higher strength against shearing than against exfoliation, the body member 20 and closure member 22 can maintain their closed cross section to reliably bear the applied load, resulting in an increased impact resistance of the bumper reinforcement.

In embodiments where the inner stiffener 24 is utilized, an external impact can be borne by the stiffener 24 as well so that deformation (e.g. by buckling) of the cross section is minimized by the stiffener 24, resulting in an increased impact resistance. For example, a collision impact may be applied to the surface of the central portion 22a of the closure member 22 as illustrated in FIG. 8. The lateral edges 22b and 22c of the closure member 22 and the sidewall portions 20b and 20c of the body member 20 at the spot welds 28 then leans outward as indicated by the arrows H1. This leaning deformation H1 induces an inward deflection of the sidewall portions 20b and 20c of the body member 20, that is, a deformation in their middle part toward the lateral portions 24b and 24c of the inner stiffener 24, as indicated by the arrows H2. This inward deformation 112 closes the clearance between the body member 20 and the stiffener 24 until the sidewall portions 20b and 20c of the body member 20 butts against the lateral portions 24b and 24c of the stiffener 24. The lateral portions 24b and 24c of the stiffener 24 then generate a reaction force to prevent or minimize the deformation of the sidewall portions of the body member. This process consequently prevent or minimize collapse of the sidewall portions 20b and 20c of the body member 20 before the bumper reinforcement bears a greater load.

As described above, the stiffener 24 may have a hollow, generally rhombic or squashed hexagonal or octagonal cross section, wherein the upper portion 24a is joined to the closure member 22 by the laser welding 31, and the lower portion 24d is joined to the bottom portion 20a of the body member 20 by the laser welding 31, so that the collision impact can be borne by the entire stiffener 24. The operations of the stiffener 24 described above, when combined with each other, can further increase impact resistance.

Figure 9:
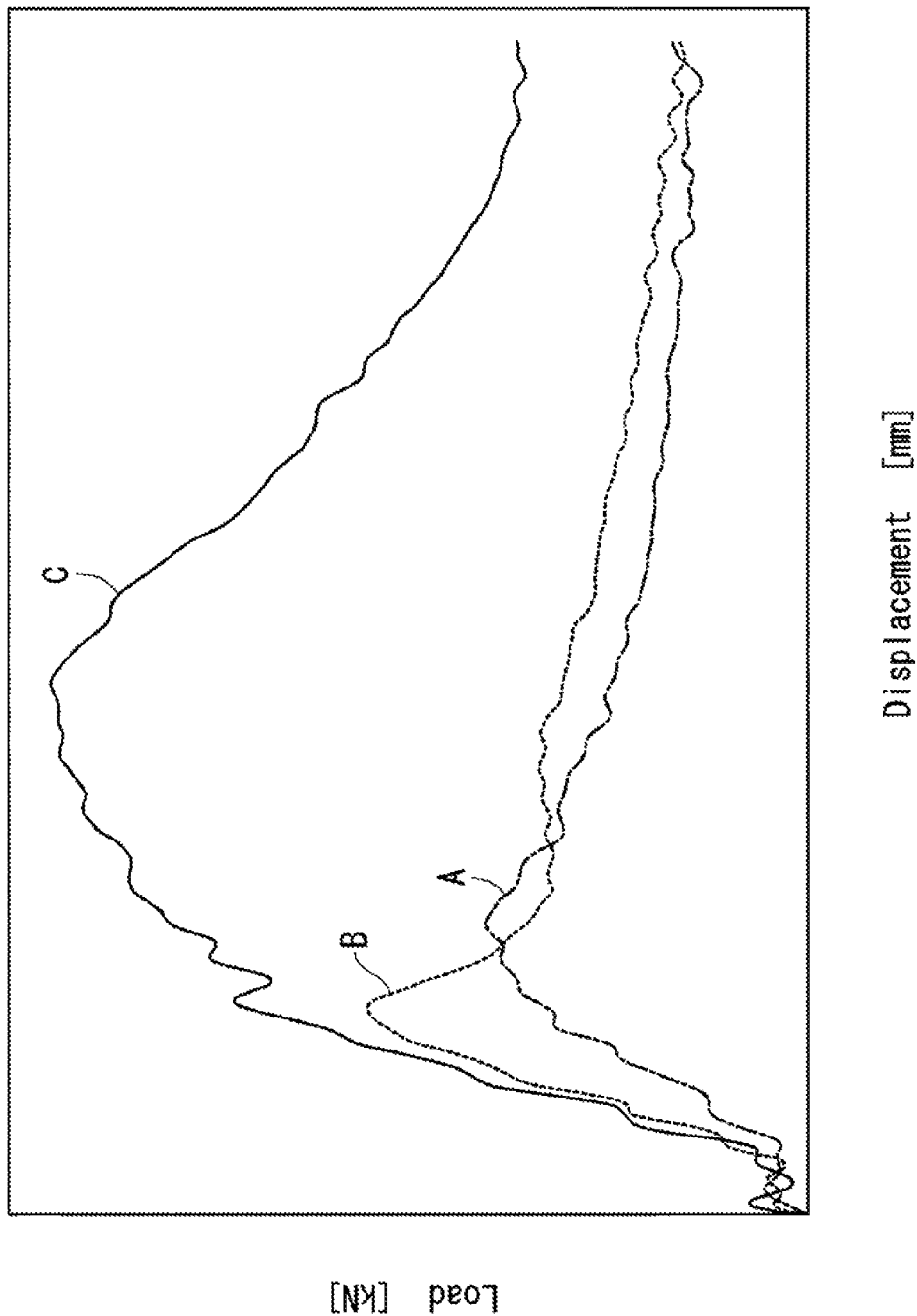
FIG. 9 is a chart illustrating variations in load plotted versus the displacement according to the embodiments of FIGS. 3 and 5 and a conventional structure according to FIG. 12.
Figure 12:
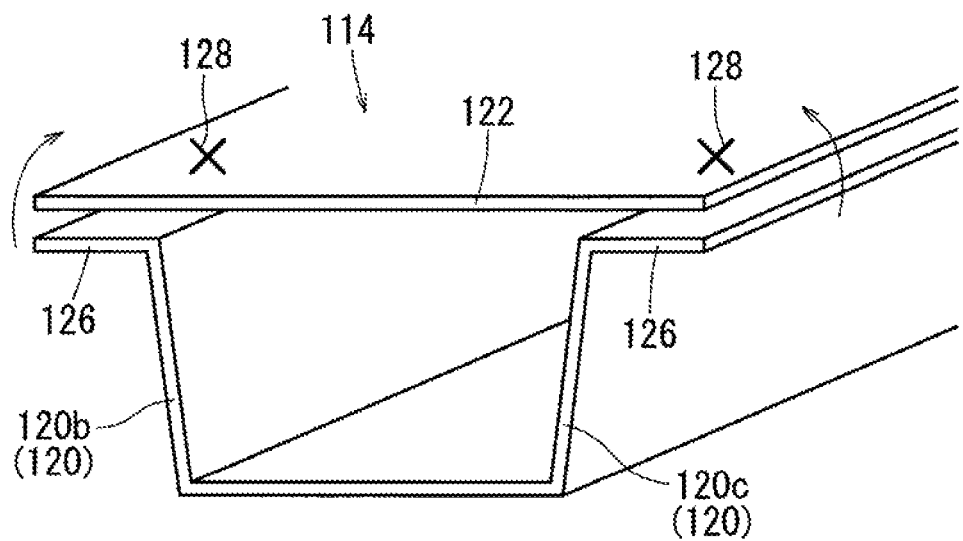
FIG. 12 is a perspective view illustrating a conventional bumper reinforcement.

FIG. 9 is a chart showing a result of the three-point bending, test as illustrated in FIG. 13, where the variations in the load applied to three example bumper reinforcement A, B and C are plotted versus the displacement of the loading member 136. In the chart, "A" represents a bumper reinforcement of a conventional type as shown in FIG. 12, "B" a bumper reinforcement 514 as shown in FIG. 5, and "C" a bumper reinforcement 14 as shown in FIG. 3. As clearly shown in the three graphs, the peak load, at which buckling occurs, is higher for both the bumper reinforcements B and C, and particularly remarkably higher for C.

Figure 10:
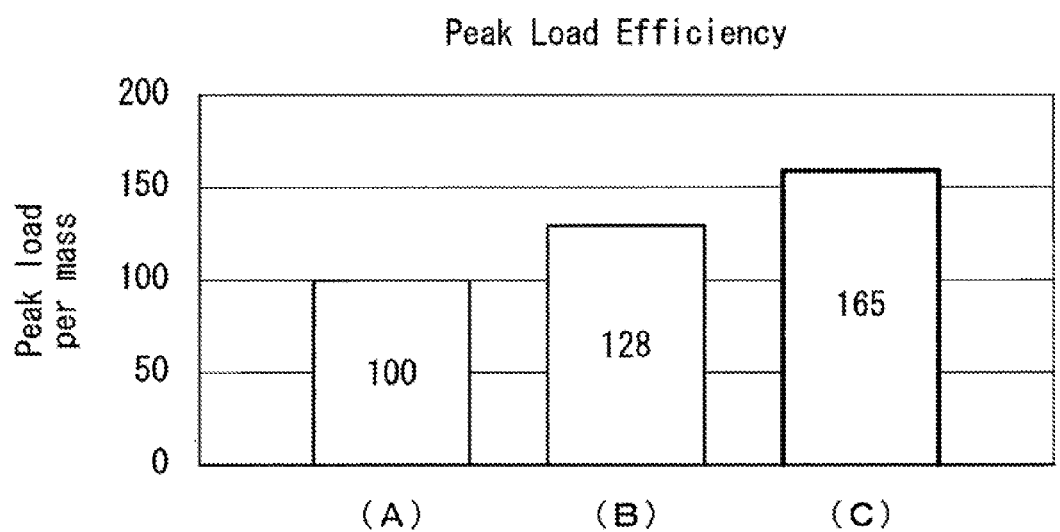
FIG. 10 is a graph illustrating comparison of the peak load efficiency among the embodiments of FIGS. 3 and 5 and the conventional structure according to FIG. 12.

FIG. 10 shows a comparison of the peak load efficiencies. The peak load efficiency is obtained as the peak load divided by the mass of bumper reinforcement. If the efficiency for A is defined as 100, the efficiencies for B and C are higher at 128 and 165, respectively.

Figure 11:
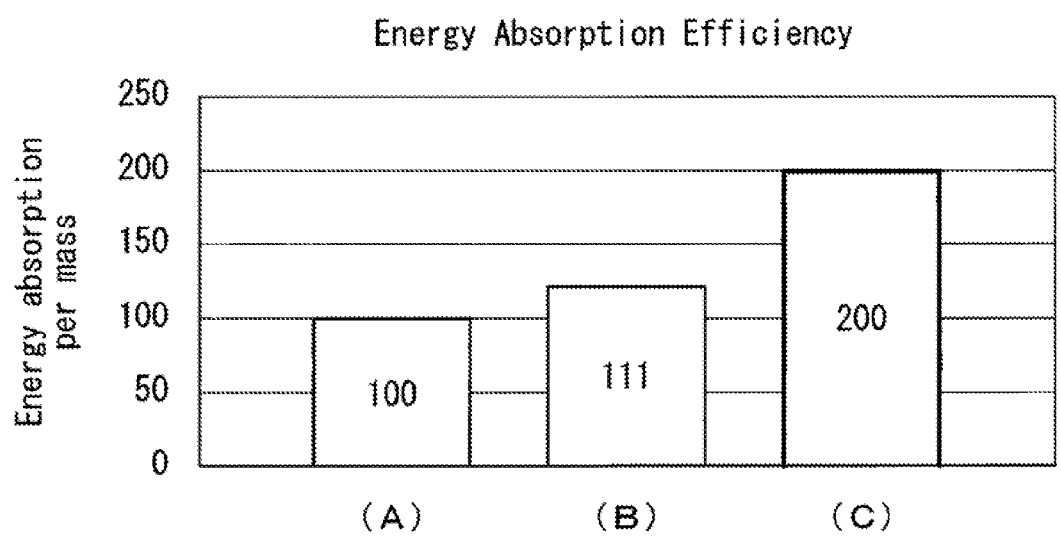
FIG. 11 is a graph illustrating comparison of the energy absorption efficiency among the embodiments of FIGS. 3 and 5 and the conventional structure according to FIG. 12.

FIG. 11 shows a comparison of energy absorption efficiency. The energy absorption efficiency is obtained as the energy absorption divided by the mass of bumper reinforcement. If the efficiency for A is defined as 100, the efficiencies for B and C are higher at 111 and 200, respectively in this estimation, the energy absorption has been evaluated by integrating the load over the interval of displacement from 0 to 150 mm in the chart of FIG. 9.

While various embodiments of the present invention have been shown and described, it should be understood that other modifications, substitutions and alternatives are apparent to one of ordinary skill in the art Such modifications, substitutions and alternatives can be made without departing from the spirit and scope of the invention, which should be determined from the appended claims.

What is claimed is:

1. A bumper reinforcement comprising:
  an elongated, channel-shaped body member with a bottom portion secured to a bumper support, sidewall portions, and an open side; and
  a closure member closing the open side of the body member so that the bumper reinforcement has a closed cross section, wherein the closure member provides an impact surface that receives an external impact,
  the closure member comprising lateral edges angled from a central portion, the closure member being welded to the body member with the lateral edges of the closure member laid on inner surfaces of open side edges of the sidewall portions of the body member.

2. The bumper reinforcement of claim 1, wherein the bumper reinforcement is disposed in a front or rear of an automobile such that the bumper reinforcement extends along a width of the automobile and that the open side of the body member is directed outward of the automobile.

3. The bumper reinforcement of claim 1, wherein the central portion of the closure member is substantially planar and extending in a plane of open side edges of the channel-shaped body member at the closure member, and the closure member further comprises a transitional portion between the central portion and each lateral edge, the transitional portion being recessed toward the bottom portion of the body member.

4. The bumper reinforcement of claim 1, wherein no flanges are present at the open side edges of the body member.

5. The bumper reinforcement of claim 1, further comprising a stiffener disposed inside the body member and closure member, the stiffener having lateral portions that project toward the sidewall portions of the body member, and the stiffener being joined to the bottom portion of the body member and to the closure member.

6. The bumper reinforcement of claim 5, wherein the stiffener is generally of closed cross section with a substantially planar upper portion joined to the closure member and a substantially planar lower portion joined to the bottom portion of the body member.

7. The bumper reinforcement of claim 5, wherein the lateral portions of the stiffener are spaced from the sidewall portions of the body member with a clearance therebetween to allow for an inward deflection of the sidewall portions of the body member when the bumper reinforcement is subjected to an external impact.

8. The bumper reinforcement of claim 5, wherein the stiffener comprises two stiffener halves joined to each other.

* * * * *